United States Patent
Ikeda

(10) Patent No.: US 9,778,646 B2
(45) Date of Patent: Oct. 3, 2017

(54) ROBOT CONTROLLER FOR CONTROLLING ROBOT WHICH SUPPLIES AND DISCHARGES WORKPIECE

(71) Applicant: FANUC Corporation, Yamanashi (JP)

(72) Inventor: Yoshitaka Ikeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 293 days.

(21) Appl. No.: 14/637,431

(22) Filed: Mar. 4, 2015

(65) Prior Publication Data

US 2015/0253757 A1 Sep. 10, 2015

(30) Foreign Application Priority Data

Mar. 7, 2014 (JP) ................................ 2014-045556

(51) Int. Cl.
*G05B 19/402* (2006.01)
*G05B 19/418* (2006.01)

(52) U.S. Cl.
CPC ..... *G05B 19/402* (2013.01); *G05B 19/41825* (2013.01); *G05B 2219/39143* (2013.01); (Continued)

(58) Field of Classification Search
CPC ............ G05B 19/402; G05B 19/41825; G05B 19/404–19/406; G05B 19/4063–19/4067; G05B 19/41815; G05B 19/4184; G05B 23/0259; G05B 23/0286–23/0291; G05B 2219/39143; G05B 2219/39155; G05B 2219/40409; G05B 2219/49001; G05B 2219/39102; G05B 2219/39191; (Continued)

(56) References Cited

U.S. PATENT DOCUMENTS 5,220,718 A * 6/1993 Speller, Sr. ........... B23P 21/004
29/430
6,377,869 B1 * 4/2002 Watanabe .............. B25J 9/1674
318/567

(Continued)

FOREIGN PATENT DOCUMENTS

DE 102004020945 B3 1/2006
DE 102005009283 A1 8/2006
(Continued)

*Primary Examiner* — Bao Long T Nguyen
(74) *Attorney, Agent, or Firm* — Hauptman Ham, LLP

(57) ABSTRACT

A robot controller used in a system having a machine tool and a robot, by which the robot is properly operated corresponding to an operation state of the machine tool. The robot controller has a data communicating part which obtains data representing an operation state of the machine tool at predetermined timing; a motion pattern storing part which stores a plurality of motion patterns of the robot for the machine tool; and a motion controlling part which selects a motion pattern from the stored plurality of motion patterns when an abnormality occurs in the machine tool or when an operation state of the machine tool satisfies a predefined condition, and operates the robot based on the selected motion pattern, the selected pattern being associated with an operation state of the machine tool when an abnormality occurs or when the operation state satisfies the predefined condition.

6 Claims, 1 Drawing Sheet

(52) U.S. Cl.
CPC .............. *G05B 2219/39155* (2013.01); *G05B 2219/40409* (2013.01); *G05B 2219/49001* (2013.01); *Y02P 90/087* (2015.11); *Y02P 90/265* (2015.11); *Y10S 901/02* (2013.01)

(58) Field of Classification Search
CPC ........... G05B 2219/40224; G05B 2219/39101; G05B 2219/39105; G05B 2219/39135; Y02P 90/087; Y02P 90/265; Y10S 901/02; Y10S 901/06–901/08; B25J 9/1666–9/1669; B25J 9/1674; B25J 9/1687
USPC .... 700/250, 247, 248, 249, 253, 254; 901/2, 901/6, 7, 8; 318/568.24
See application file for complete search history.

(56) References Cited

U.S. PATENT DOCUMENTS

| | | | | |
|---|---|---|---|---|
| 8,260,461 | B2* | 9/2012 | Krishnasamy | ........... B25J 9/107 700/254 |
| 2008/0271304 | A1 | 11/2008 | Grossmann | |
| 2013/0297071 | A1* | 11/2013 | Hediger | ................. B25J 13/089 700/258 |
| 2015/0082596 | A1* | 3/2015 | Carter | .................... B65G 15/00 29/402.08 |

FOREIGN PATENT DOCUMENTS

| | | |
|---|---|---|
| DE | 102006003985 A1 | 7/2007 |
| DE | 102007018368 A1 | 10/2008 |
| DE | 102010016727 A1 | 1/2011 |
| JP | S63-318237 A | 12/1988 |
| JP | H01-205964 A | 8/1989 |
| JP | 4-191907 A | 7/1992 |
| JP | H05-26628 B2 | 4/1993 |
| JP | 8-202408 A | 8/1996 |
| JP | 9-244728 A | 9/1997 |
| JP | 2001-154717 A | 6/2001 |
| JP | 4316751 B2 | 8/2009 |
| JP | 4815940 B2 | 11/2011 |

* cited by examiner

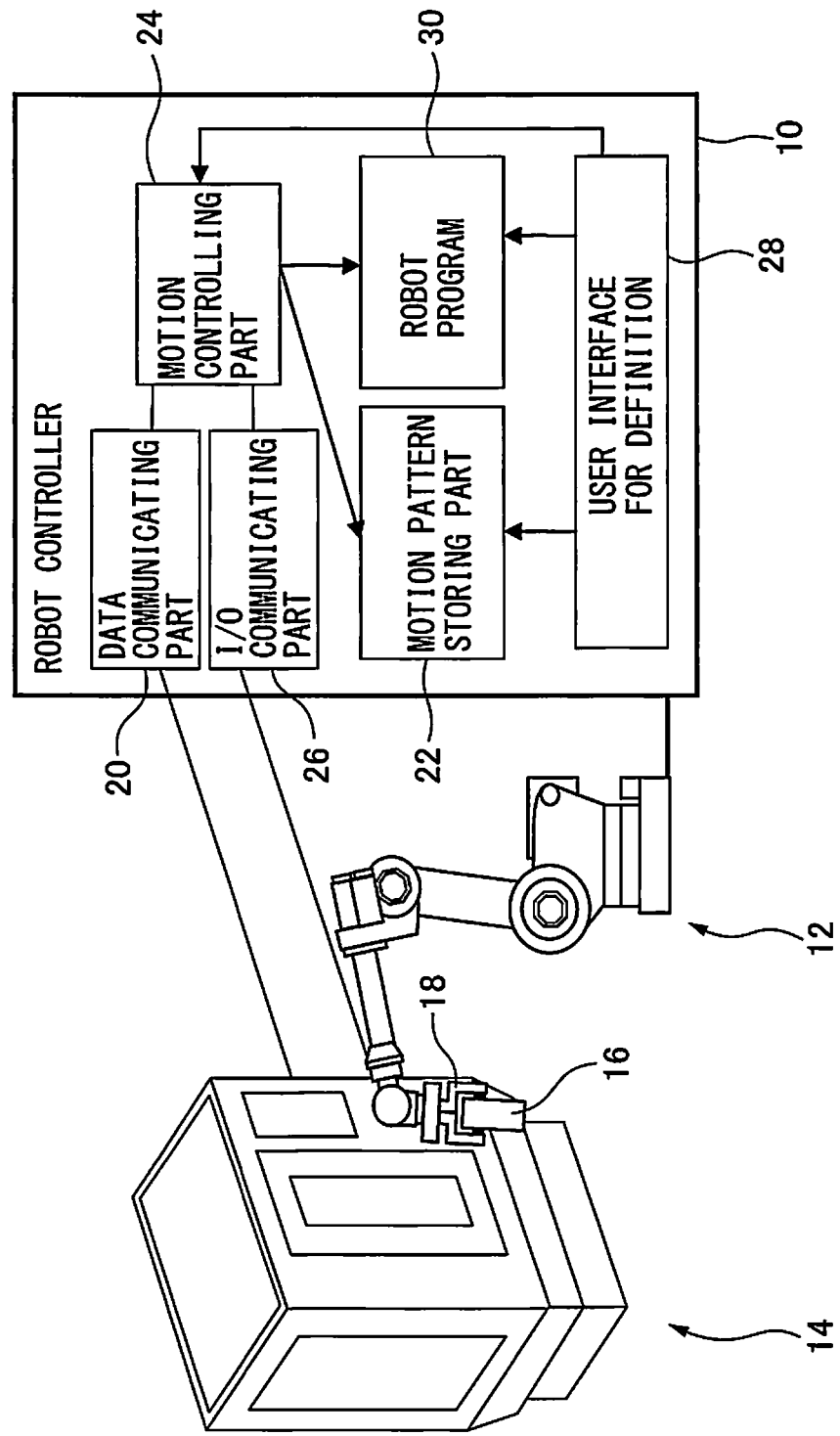

ROBOT CONTROLLER FOR CONTROLLING ROBOT WHICH SUPPLIES AND DISCHARGES WORKPIECE

RELATED APPLICATIONS

The present application claims priority to Japanese Application Number 2014-045556, filed Mar. 7, 2014, the disclosure of which is hereby incorporated by reference herein in its entirety.

BACKGROUND OF THE INVENTION

1. Field of the Invention

The preset invention relates to a robot controller for controlling a robot which supplies and discharges a workpiece to and from a machine tool.

2. Description of the Related Art

In a robot for supplying a material (or a workpiece) to a machine tool and for discharging the workpiece processed in the machine tool (or a product) from the machine tool, it is necessary that a robot controller for controlling the robot recognize a status of the machine tool, in order to determine the motion of the robot corresponding to the status of the machine tool.

As relevant prior art documents, JP S63-318237 A discloses a processing system having a lathe with a robot, wherein a signal is transmitted to the robot so that the robot and the lathe return to the respective origins before processing, when the lathe can no longer continue the processing due to termination of a life of a tool, etc.

JP H05-026628 B discloses a processing system wherein a workpiece is attached or detached by a robot when the workpiece is to be processed in an NC machine tool. JP H05-026628 B also discloses a means to output an alarm when a defect of the workpiece or failure of chucking the workpiece is detected so that appropriate measures can be automatically taken against the detect or failure by controlling the robot or chuck.

Further, JP H01-205964 A discloses a workpiece processing system wherein a plurality of cells, constituted by a plurality of machine tools and robots attached thereto, are controlled and operated by a host computer. In the processing system, processing patterns of deficiencies regarding a life and/or defect of the tool, etc., are previously stored in both the cells and the host computer, and the processing patterns are automatically executed when a deficiency occurs.

As described in JP S63-318237 A, in the prior art, a robot is informed of an abnormality of a machine tool by means of a signal, and then the robot carries out operations such as returning to the origin, taking out a workpiece and exchanging a tool, etc., corresponding to the input signal. However, when a signal is used, programming for assigning, defining and inputting/outputting of the signal is necessary in both the machine tool and the robot. In order to specify the motion of the robot in detail corresponding to the content of the abnormality in such a configuration, a burdensome operation such as increasing various signals is necessary. Further, after a production operation is started, it is difficult to add a signal or change a program, and thus it is difficult to judge a situation and add an operation corresponding to the situation.

JP H05-026628 B does not explicitly describe the usage of a signal. However, sine this document describes that a CPU is connected to a robot unit via a programmable controller, it can be understood that a signal is used to inform an abnormal situation. Therefore, the configuration of JP H05-026628 B has the same problem as in JP S63-318237 A.

On the other hand, in JP H01-205964 A, the processing cell is stopped in an emergency manner (i.e., a processed workpiece and a material workpiece are conveyed to a product pallet and a material pallet, respectively, and the lathe and the robot are returned to the respective origins) when a defect occurs in the cell, a signal informing the stoppage of the cell is transmitted to the host computer. Then, it is judged as to whether the processing can be restarted, a power-off command is confirmed, and process information regarding another lot is transmitted, etc. In other words, in JP H01-205964 A, the lathe and the robot are returned to the respective origins when an abnormality occurs in the processing cell, and after that, information regarding the motion of the entire cell is transmitted between the processing cell and the host computer. However, there are many kinds of abnormalities in an actual machine tool, and it is not always appropriate to stop the machine tool in an emergency (i.e., return the machine tool and the robot to the respective origins) regardless of the kind of abnormality.

SUMMARY OF THE INVENTION

Therefore, an object of the present invention is to provide a robot controller used in a system having a machine tool and a robot, by which the robot is properly operated corresponding to an operation state of the machine tool.

According to the present invention, there is provided a robot controller for controlling a robot which supplies and/or discharges a workpiece to and/or from each of at least one machine tool, the robot controller comprising: a data communicating part which obtains data representing an operation state of the machine tool at predetermined timing by means of communication with the machine tool; a motion pattern storing part which stores a plurality of motion patterns of the robot for the machine tool; and a motion controlling part which selects a motion pattern from the plurality of motion patterns stored in the motion pattern storing part when an abnormality occurs in the machine tool or when an operation state of the machine tool satisfies a predefined condition, and operates the robot based on the selected motion pattern, the selected pattern being associated with an operation state of the machine tool when the abnormality occurs in the machine tool or when the operation state of the machine tool satisfies the predefined condition.

In a preferred embodiment, the data communicating part obtains the data representing the operation state of the machine tool during process operation of the machine tool when the abnormality occurs in the machine tool; and wherein the motion controlling part selects one motion pattern from the plurality of motion patterns including withdrawing the robot to an origin position, discharging a workpiece when being processed in the machine tool, and preparing restart of the processing in the machine tool, and operates the robot based on the selected motion pattern.

In a preferred embodiment, the data communicating part obtains the data representing the operation state of the machine tool at predetermined time intervals; and wherein, when the operation state of the machine tool satisfies the predefined condition, the motion controlling part selects a motion pattern regarding checking or maintenance of the machine tool, and operates the robot based on the selected motion pattern.

In a preferred embodiment, the robot controller has a robot program, in which the plurality of motion patterns are defined and the data representing the operation state of the machine tool is designated as at least one of a branch condition, a waiting condition and a waiting-release condition of the robot program; and wherein the motion controlling part automatically updates the data representing the operation state of the machine tool obtained by the data communicating part so as to change an execution sequence of the robot program corresponding to the operation state of the machine tool.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1 shows a schematic configuration of a system including a robot controller according to the present invention, a robot controlled by the robot controller, and a machine tool in which the robot in operated.

DETAILED DESCRIPTIONS

FIG. 1 is a functional block diagram of a robot controller 10 according to a preferred embodiment of the present invention, along with a robot 12 controlled by robot controller 10 and a machine tool 14 such as a lathe in which robot 12 is operated. For example, robot 12 is a multi-joint robot having six axes, and has a hand 18 configured to grip a workpiece 16 or an object to be machined in machine tool 14 so that robot 12 supplies and/or discharges workpiece 16 to and/or from machine tool 14. In addition, robot 12 may have functions to exchange a tool of the machine tool and clean a predetermined section of the machine tool by means of pressurized air or liquid, as well as supply/discharge the workpiece.

For example, machine tool 14 is a numerical control (NC) machine tool. Although one machine tool 14 is used in FIG. 1, robot 12 may sequentially supply and/or discharge workpieces to and/or from a plurality of NC machine tools 14.

Robot controller 10 has a data communicating part 20 which obtains data representing an operation state of machine tool 14 at predetermined timing by means of communication with machine tool 14; a motion pattern storing part 22 which stores a plurality of motion patterns of robot 12 for machine tool 14; and a motion controlling part 24 which selects a motion pattern from the plurality of motion patterns stored in motion pattern storing part 22 when an abnormality occurs in machine tool 14 or when an operation state of machine tool 14 satisfies a predefined condition, and operates robot 12 based on the selected motion pattern, the selected pattern being associated with an operation state of machine tool 14 when the abnormality occurs in machine tool 14 or when the operation state of machine tool 14 satisfies the predefined condition.

Data communicating part 20 communicates with a numerical controller (in the illustrated embodiment, it is incorporated in machine tool 14) for controlling machine tool 14, and obtains the data representing the operation state of machine tool 14. In this regard, the data representing the operation state may include: data representing an error code, etc., which represents an abnormality generated in machine tool 14 (e.g., overload applied to a motor of the machine tool, grip-miss of the workpiece in a chuck, etc., of the machine tool); and data representing a progress situation or level of a program being executed in machine tool 14 (e.g., where (which line) in the program the abnormality occurs).

As described above, data communicating part 20 may obtain a lot of information including machining situation of machine tool 14 and current execution state of the program, etc., as well as an alarm informing that an abnormality occurs in machine tool 14, or information informing that a duration of use of a tool of machine tool 14 reaches a predetermined life length of thereof. Further, robot controller 10 may have an I/O communicating part 26 configured to communicate with machine tool 14. In this case, data communicating part 20 and I/O communicating part 26 may be used for different purposes. For example, I/O communicating part 26 may be used to receive a conventional error signal, etc., of the machine tool, and data communicating part 20 may be used to receive the data regarding the machining situation of machine tool 14 and/or the current execution state of the program, etc.

Motion pattern storing part 22 stores a plurality of typical motion patterns of robot 12, which are respectively associated with various operation states of machine tool 14. For example, the motion patterns may include: withdrawing (returning) robot 12 to an origin position; discharging (taking out) a workpiece during being processed in machine tool 14; and preparing restart of the processing in machine tool 14, such as exchanging a tool or a pallet, etc. Further, when robot 12 is configure to carry out a motion regarding checking or maintenance of the machine tool, the motion patterns may include: exchanging (attaching/detaching) a tool of machine tool 14; and cleaning a predetermined section of machine tool 14 (e.g., a portion where chips easily accumulate) by using pressurized air or liquid, etc.

Robot controller 10 may include a user interface 28 for definition, whereby an operator can change and/or register the motion pattern, and can modify robot program 30, via interface 28.

Motion controlling part 24 has a function to control the motion of robot 12 based on given robot program 30. Concretely, motion controlling part 24 controls a motor (for example, a servomotor) which drives each axis of robot 12. Further, motion controlling part 24 analyzes the data representing the operation state of machine tool 14 obtained by data communicating part 20 during the process operation of machine tool 14 when an abnormality occurs in machine tool 14 (in detail, when I/O communicating part 26 or data communicating part 20 receives a signal informing occurrence of the abnormality from machine tool 14), and judges the type of the operation state of machine tool 14 when the abnormality occurs. Then, motion controlling part 24 selects a motion pattern associated with the operation state of machine tool 14 when the abnormality occurs, and controls robot 12 based on the selected motion pattern.

For example, when an abnormality occurs at the beginning of the execution program of machine tool 14 (i.e., when the abnormality occurs in machine tool 14 before the workpiece is processed), it is preferable that robot 12 be returned to an original position, and then the operator search and/or remove a cause of the abnormality. Otherwise, when an abnormality occurs at the end of the execution program of machine tool 14 (i.e., when the abnormality occurs in machine tool 14 after the processing of the workpiece is completed), it is preferable that robot 12 take out the processed workpiece and convey it a predetermined place, and then the operator search and/or remove a cause of the abnormality. In this way, an appropriate motion of robot 12 can be automatically selected and carried out, depending on a stage of a series of processing in machine tool 14 where an abnormality occurs.

Motion controlling part 24 may obtain the data representing the operation state of machine tool 14 at predetermined time intervals, and may operate robot 12 so as to exchange a tool of machine tool 14, when an accumulated operating time of the tool reaches a predetermined life length of the tool (i.e., when the tool should be exchanged). Alternatively or additionally, motion controlling part 24 may obtain information regarding an accumulated processing time of machine tool 14 or the number of workpieces processed by machine tool 14 at predetermined time intervals, and may operate robot 12 so as to clean a predetermined section of machine tool 14 (e.g., a portion where chips easily accumulate) by using pressurized air or washing water, when the accumulated processing time or the number of processed workpieces reaches a predetermined value. In this way, motion controlling part 24 may select a motion pattern regarding checking or maintenance of machine tool 14, and may operate robot 12 based on the selected motion pattern, when the operation state of machine tool 14 satisfies the predefined condition.

As described above, the motion pattern to be carried out by robot 12 depending on the operation state of machine tool 14 or the progress level of the execution program may be previously stored in controller 10 (or motion pattern storing part 22), and may be appropriately selected and executed by motion controlling part 24. In this regard, in order that the operator can easily customize each system, a plurality of motion patterns may be defined in robot program 30, and the data representing the operation state of machine tool 14 may be designated as at least one of a branch condition, a waiting condition and a waiting-release condition of the program. In this case, motion controlling part 24 may automatically update the data representing the operation state of machine tool 14 obtained by data communicating part 20 so as to change an execution sequence of robot program 30 corresponding to the operation state of the machine tool, whereby robot 12 can carry out the motion pattern corresponding to the operation state.

In this way, judgment of the operation state of machine tool 14 and/or selection of the motion pattern corresponding to the operation state may be defined in the robot program, and the data representing the operation state of the machine tool may be designated as the branch condition, etc., of the program. Therefore, the motion of the robot corresponding to the operation state can be easily designated, and the system can be easily customized by rewriting the robot program.

According to the present invention, in the robot configured to supply and discharge the processed workpiece to and from the machine tool, the robot can carry out various motions corresponding to the operation state of the machine tool. For example, when an abnormality occurs in the machine tool, the robot can carry out recovery, etc., in more detail than the prior art, corresponding to the state of the machine tool. Further, by monitoring the state of the machine tool at predetermined time intervals, the robot can carry out checking or maintenance required in the machine tool in a timely manner.

Due to the feature wherein judgment of the operation state of the machine tool and/or selection of the motion pattern corresponding to the operation state can be defined in the robot program, and wherein the data representing the operation state of the machine tool can be designated as the branch condition, etc., of the program, the system including the robot and the machine tool can be easily customized.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller for controlling a robot which supplies and/or discharges a workpiece to and/or from each of at least one machine tool, the robot controller comprising:
   a data communicating part which obtains data representing an operation state of the machine tool at predetermined timing by communication with the machine tool;
   a motion pattern storing part which stores a plurality of motion patterns of the robot for the machine tool; and
   a motion controlling part which
      automatically selects a motion pattern from the plurality of motion patterns stored in the motion pattern storing part when an abnormality occurs in the machine tool or when an operation state of the machine tool satisfies a predefined condition, and
      operates the robot based on the selected motion pattern,
      wherein the selected motion pattern is associated with an operation state of the machine tool when the abnormality occurs in the machine tool or when the operation state of the machine tool satisfies the predefined condition,
   wherein the motion controlling part
      obtains the data representing the operation state of the machine tool at predetermined time intervals, and
      operates the robot so as to exchange a tool of the machine tool, when an accumulated operating time of the tool reaches a predetermined life length of the tool.

2. The robot controller as set forth in claim 1,
   wherein the data communicating part obtains the data representing the operation state of the machine tool during process operation of the machine tool when the abnormality occurs in the machine tool, and
   wherein the plurality of motion patterns, from which the motion controlling part selects the selected motion pattern, include
      withdrawing the robot to an origin position,
      discharging a workpiece when being processed in the machine tool, and
      preparing restart of the processing in the machine tool.

3. The robot controller as set forth in claim 1,
   wherein the data communicating part obtains the data representing the operation state of the machine tool at predetermined time intervals, and
   wherein, when the operation state of the machine tool satisfies the predefined condition, the motion controlling part selects the selected motion pattern regarding checking or maintenance of the machine tool.

4. The robot controller as set forth in claim 1,
   wherein the robot controller has a robot program, in which the plurality of motion patterns are defined and the data representing the operation state of the machine tool is designated as at least one of (1) a branch condition, (2) a waiting condition and (3) a waiting-release condition of the robot program, and
   wherein the motion controlling part automatically updates the data representing the operation state of the machine tool obtained by the data communicating part so as to change an execution sequence of the robot program corresponding to the operation state of the machine tool.

5. The robot controller as set forth in claim 4, further comprising:
a user interface through which the plurality of motion patterns are changed and stored in the motion pattern storing part,
wherein the robot program is modifiable through the user interface.

6. A robot controller for controlling a robot which supplies and/or discharges a workpiece to and/or from each of at least one machine tool, the robot controller comprising:
a data communicating part which obtains data representing an operation state of the machine tool at predetermined timing by communication with the machine tool;
a motion pattern storing part which stores a plurality of motion patterns of the robot for the machine tool; and
a motion controlling part which
automatically selects a motion pattern from the plurality of motion patterns stored in the motion pattern storing part when an abnormality occurs in the machine tool or when an operation state of the machine tool satisfies a predefined condition, and
operates the robot based on the selected motion pattern,
wherein the selected motion pattern is associated with an operation state of the machine tool when the abnormality occurs in the machine tool or when the operation state of the machine tool satisfies the predefined condition,
wherein the motion controlling part
obtains information regarding an accumulated processing time of the machine tool or a number of workpieces processed by the machine tool at predetermined time intervals, and
operates the robot so as to clean a predetermined section of the machine tool, when the accumulated processing time or the number of processed workpieces reaches a predetermined value.

* * * * *